US009227496B2

(12) United States Patent
Sawada

(10) Patent No.: US 9,227,496 B2
(45) Date of Patent: Jan. 5, 2016

(54) ROOF APPARATUS

(71) Applicant: AISIN SEIKI KABUSHIKI KAISHA, Kariya-shi, Aichi-ken (JP)

(72) Inventor: Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/468,649

(22) Filed: Aug. 26, 2014

(65) Prior Publication Data

US 2015/0061326 A1    Mar. 5, 2015

(30) Foreign Application Priority Data

Aug. 29, 2013   (JP) .................................. 2013-178211

(51) Int. Cl.
| | |
|---|---|
| *B60J 10/12* | (2006.01) |
| *B60J 10/00* | (2006.01) |
| *B60J 7/043* | (2006.01) |
| *B62D 65/08* | (2006.01) |

(52) U.S. Cl.
CPC .............. *B60J 10/006* (2013.01); *B60J 7/0435* (2013.01); *B60J 10/0065* (2013.01); *B60J 10/0088* (2013.01); *B60J 10/12* (2013.01)

(58) Field of Classification Search
CPC .............. B60J 10/0014; B60J 10/0031; B60J 10/0062; B60J 10/0068; B60J 10/12
USPC ........... 296/216.06–216.09; 49/489.1, 490.1, 49/492.1, 495.1, 498.1
See application file for complete search history.

(56) References Cited

U.S. PATENT DOCUMENTS

| | | | |
|---|---|---|---|
| 6,395,371 B1 | 5/2002 | Nozaki et al. | |
| 8,807,639 B2 * | 8/2014 | Sawada | 296/216.06 |
| 8,807,640 B2 * | 8/2014 | Sawada | 296/216.06 |
| 2007/0228779 A1 | 10/2007 | Stallfort | |
| 2012/0068502 A1 | 3/2012 | Sawada | |
| 2013/0307295 A1* | 11/2013 | Sawada | 296/220.01 |
| 2014/0203597 A1* | 7/2014 | Kikuchi et al. | 296/222 |
| 2014/0312658 A1* | 10/2014 | Sawada | 296/220.01 |

FOREIGN PATENT DOCUMENTS

JP    2012-62023    3/2012

OTHER PUBLICATIONS

K. Sawada, "Roof Apparatus", U.S. Appl. No. 14/256,100, filed Apr. 18, 2014.

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A roof apparatus includes: a movable panel opening and closing an opening of a roof of a vehicle; a mounting member including a mounting wall extending upright in one direction along an edge portion of the opening; and a weather strip having an attaching portion including pinching strips pinching the mounting wall therebetween, a first seal portion connected to the attaching portion and coming into liquid-tight contact with an opening end edge, and a second seal portion connected to the attaching portion and coming into liquid-tight contact with a peripheral edge in a fully closed state. A mounting depression depressed in the inner and outer direction of the vehicle is formed on the mounting wall. The attaching portion includes a lip portion connected to one of the pinching strips facing the mounting depression, and engageably inserted into the mounting depression.

7 Claims, 3 Drawing Sheets

ROOF APPARATUS

CROSS REFERENCE TO RELATED APPLICATIONS

This application is based on and claims priority under 35 U.S.C. §119 to Japanese Patent Application 2013-178211, filed on Aug. 29, 2013, the entire contents of which are incorporated herein by reference.

TECHNICAL FIELD

This disclosure relates to a roof apparatus provided with a movable panel adapted to open and close an opening formed in a roof of a vehicle.

BACKGROUND DISCUSSION

In the related art, various types of the roof apparatus are proposed. For example, a roof apparatus disclosed in JP 2012-62023A (Reference 1) includes a weather strip 95 provided between a flange-shaped opening edge 91a of a roof 91 and a flange-shaped peripheral edge 92a of a movable panel 92 to seal between the opening edge 91a and the peripheral edge 92a as illustrated in FIG. 5. In other words, the weather strip 95 includes an attaching portion 96 having a cored bar 97 embedded therein and being formed into a substantially U-shape in cross section. The weather strip 95 is fixed to the roof 91 by pinching the opening edge 91a with the attaching portion 96. At this time, a plurality of projections 96a, 96b, and 96c, which extend from an inner wall surface of the attaching portion 96, come into resiliently contact with the opening edge 91a, so that the weather strip 95 is retained with respect to the opening edge 91a.

The weather strip 95 includes a first seal portion 98 extending from the attaching portion 96 toward the opening edge 91a and coming into liquid-tight contact therewith, and a second seal portion 99 extending from the attaching portion 96 toward the peripheral edge 92a of the movable panel 92 and coming into liquid-tight contact therewith. From the configuration described above, the weather strip 95 seals between the opening edge 91a of the roof 91 and the peripheral edge 92a of the movable panel 92.

The weather strip 95 disclosed in Reference 1 has a structure in which the plurality of projecting portions 96a to 96c come into resilient contact with the opening edge 91a when pinching the opening edge 91a with the attaching portion 96. Therefore, dimensions of the attaching portion 96 occupying a space between the opening edge 91a and the peripheral edge 92a are increased, and hence a large arrangement space needs to be secured for the attaching portion 96.

SUMMARY

Thus, a need exists for a roof apparatus which is not suspectable to the drawback mentioned above.

An aspect of this disclosure is directed to a roof apparatus including: a movable panel configured to open and close an opening formed in a roof of a vehicle; a mounting member including a mounting wall extending upright in one direction along an edge portion of the opening; and a weather strip having an attaching portion including a pair of pinching strips configured to pinch the mounting wall therebetween, a first seal portion connected to the attaching portion and coming into liquid-tight contact with an opening end edge extending along the mounting wall of the opening, and a second seal portion connected to the attaching portion and coming into liquid-tight contact with a peripheral edge along the mounting wall of the movable panel in a fully closed state, wherein a mounting depression depressed in the inner and outer direction of the vehicle is formed on the mounting wall, and the attaching portion includes a lip portion connected to one of the pair of pinching strips which faces the mounting depression, and engageably inserted into the mounting depression.

According to the configuration described above, the weather strip is fixed to the mounting member by pinching the mounting wall with the attaching portion and fitting the lip portion into mounting depressions. In this case, the attaching portion basically has a structure in which the mounting wall is pinched by the pair of pinching strips, whereby the dimensions of the attaching portion occupying the space between the opening end edge and the peripheral edge may further be reduced.

The aspects of this disclosure have an effect of reducing dimensions of the attaching portion of the weather strip occupying the space between the opening edge of the roof and the peripheral edge of the movable panel.

BRIEF DESCRIPTION OF DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a roof apparatus will be described. In the following example, a fore-and-aft direction of a vehicle is referred to as "fore-and-aft direction", and upward and downward of the vehicle in a height direction is referred to as "upper, up, upward" or "lower, down, downward" in a height direction, depending on which parts these expressions indicate.

Figure 1:
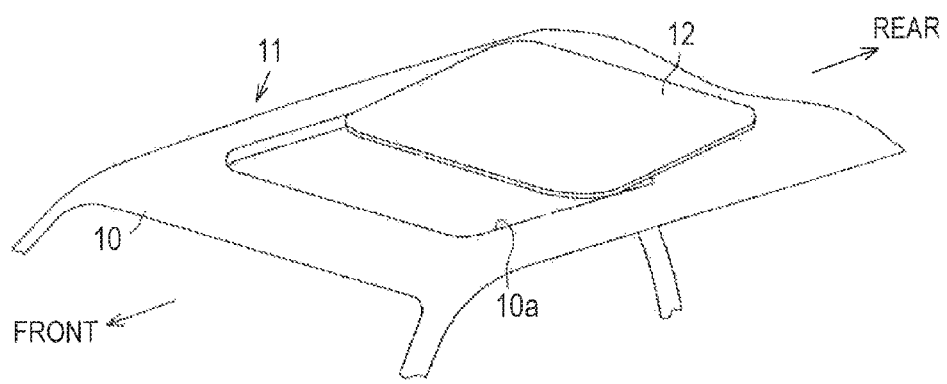
FIG. 1 is a perspective view of a roof of a vehicle.

As illustrated in FIG. 1, a roof 10 of the vehicle such as an automotive vehicle has an opening 10a of a substantially square shape formed therein, and a sunroof apparatus 11 provided thereon. The sunroof apparatus 11 is provided with a substantially square-shaped movable panel 12, being formed of, for example, a glass plate, configured to open and close the opening 10a by moving in the fore-and-aft direction. The movable panel 12 is mounted so as to perform a tilt-up operation that moves a rear portion upward by rotating about a front portion thereof, and a sliding operation in the fore-and-aft direction. In an opening and closing operation of the movable panel 12, a so-called outer sliding system, which allows the sliding operation in a tilted-up state, is employed.

Figure 2:
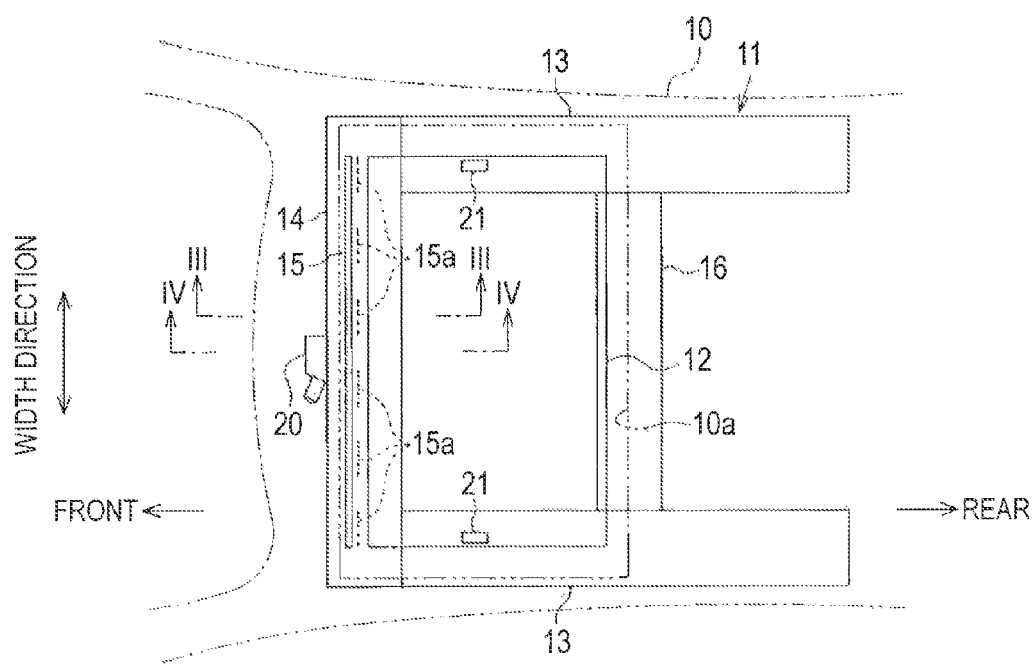
FIG. 2 is a plan view of an embodiment disclosed here.

As illustrated in FIG. 2, a pair of guide rails 13 are disposed on both side edge portions of the opening 10a in a vehicle width direction. Each of the guide rails 13 is formed of an extruded material, for example, aluminum alloy, has a constant cross section in a longitudinal direction, and extends in the fore-and-aft direction. The guide rails 13 support functional components 21 to allow a movement in the fore-and-aft direction, respectively. Both of the functional components 21 include the movable panel 12 linked and supported in a state of being bridged therebetween. The movable panel 12 performs the opening and closing operation in association with the movement of the both functional components 21 in the fore-and-aft direction.

A front housing 14 formed of a resin, extending in the vehicle width direction along a front edge portion of the opening 10a as a mounting member, is coupled to front end portions of both of the guide rails 13. The front housing 14 includes a substantially elongated shaped mounting wall 15 extending upright over the substantially entire length in the longitudinal direction. The mounting wall 15 includes a plurality of mounting depressions 15a arranged in the vehicle width direction. Each of the mounting depressions 15a is depressed forward from an end surface of the mounting wall 15 facing rearward of the vehicle toward the front, and extends in the vehicle width direction. In FIG. 2, the mounting depressions 15a are indicated by a broken line extending along the mounting wall 15 for the sake of convenience.

In addition, a rear housing 16 extending in the vehicle width direction along a rear edge portion of the opening 103 and formed of, for example, a metal plate, is coupled to the both guide rails 13 at intermediate positions in the longitudinal direction thereof. In other words, front portions of the both guide rails 13 each form a square frame in cooperation with the front housing 14 and the rear housing 16, and the opening 10a is formed along the square frame. When the movable panel 12 is in a fully closed state, an opening edge of the roof 10 is arranged to surround and face a peripheral edge of the movable panel 12 in a horizontal direction.

An electric drive source 20 such as an electric motor having an output gear, for example, is installed in the front housing 14 at an intermediate position in a longitudinal direction thereof. The electric drive source 20 is coupled to the both functional components 21 via a pair of drive belts (not illustrated) having a substantially band shape formed of a resin material, for example, and drives the functional components 21 to move in the fore-and-aft direction simultaneously.

Figure 3:
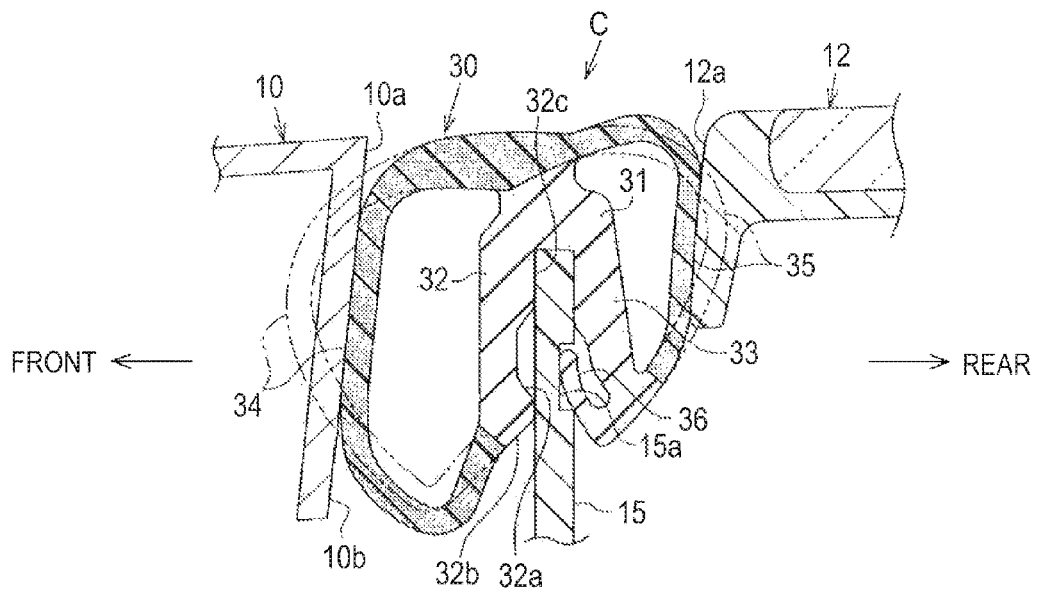
FIG. 3 is a cross-sectional view taken along a line III-III in FIG. 2.

As illustrated in FIG. 3, the opening edge of the roof 10 includes a body-side flange portion 10b having a substantially square cylindrical shape extending downward. In the same manner, a peripheral edge of the movable panel 12 includes a panel-side flange portion 12a having a substantially square cylindrical shaped extending downward.

Interposed between the body-side flange portion 10b and the panel-side flange portion 12a is a weather strip 30 having a substantially square frame shape. The weather strip 30 is pinched at an upper portion of the mounting wall 15 thereof by front portions extending in the vehicle width direction (a direction orthogonal to a paper plane in FIG. 3). In other words, front side portions of the weather strip 30 include an attaching portion 31 having a pair of pinching strips 32 and 33 that pinch the mounting wall 15, a first seal portion 34 extending in a curved manner forward of the vehicle from the attaching portion 31, and a second seal portion 35 extending in a curved manner rearward of the vehicle from the attaching portion 31.

The attaching portion 31 is formed of a solid material, for example, urethane rubber. The pinching strip 32 arranged forward of the vehicle with respect to the mounting wall 15 defines a substantially V-shaped groove portion 32a depressed forward of the vehicle at an intermediate position in the vehicle height direction, defines an abutting portion 32b which abuts against the mounting wall 15 below the groove portion 32a, and further defines an abutting portion 32c that abuts against the mounting wall 15 above the groove portion 32a. In contrast, the attaching portion 31 includes a lip portion 36 connected to a lower end of the pinching strip 33 arranged rearward of the vehicle with respect to the mounting wall 15.

The thickness of the lip portion 36 is set to be thinner than that of the pinching strip 33. The lip portion 36 extends oblique upward of the vehicle from the lower end of the pinching strip 33, and is engageably inserted into the mounting depressions 15a at positions where the mounting depressions 15a are formed. A distal end portion of the lip portion 36 to be engageably inserted into the mounting depressions 15a abuts against the mounting depressions 15a at an intermediate position between the both abutting portions 32b and 32c in the vehicle height direction. In other words, the both abutting portions 32b and 32c come into abutment respectively with the mounting wall 15 at a lower portion and an upper portion with respect to the position where the lip portion 36 abuts against the mounting depressions 15a in the vehicle height direction.

In the configuration described above, the upper portion of the mounting wall 15 is pinched by the weather strip 30 in a state of being in abutment with the mounting wall 15 at the both abutting portions 32b and 32c with the lip portion 36 engageably inserted into the mounting depressions 15a where the mounting depressions 15a are formed. In particular, the lip portion 36 engageably inserted into the mounting depressions 15a is caught thereby, the weather strip 30 is retained and fixed with respect to the mounting wall 15.

Figure 4:
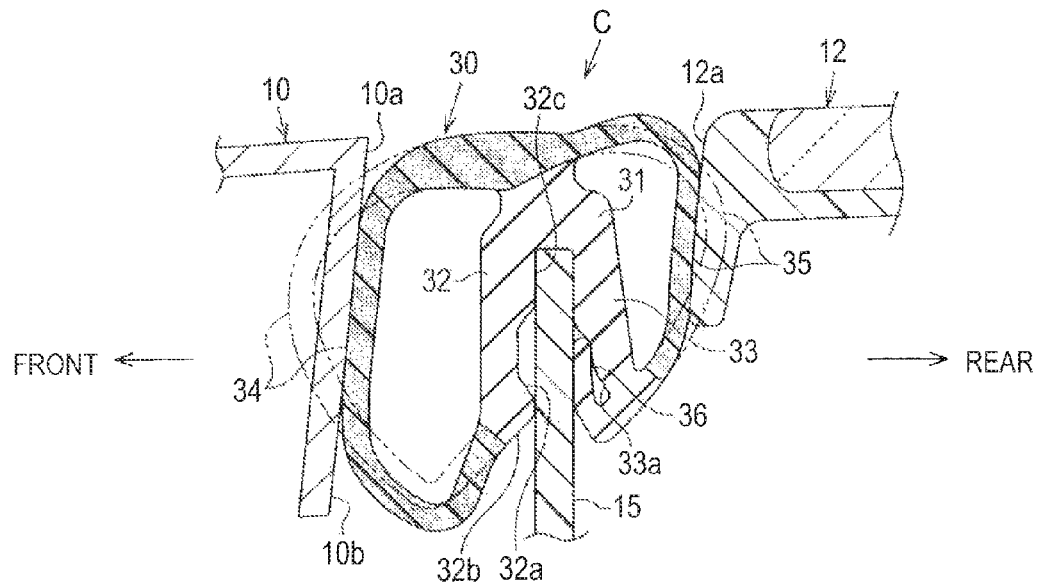
FIG. 4 is a cross-sectional view taken along a line IV-IV in FIG. 2.
Figure 5:
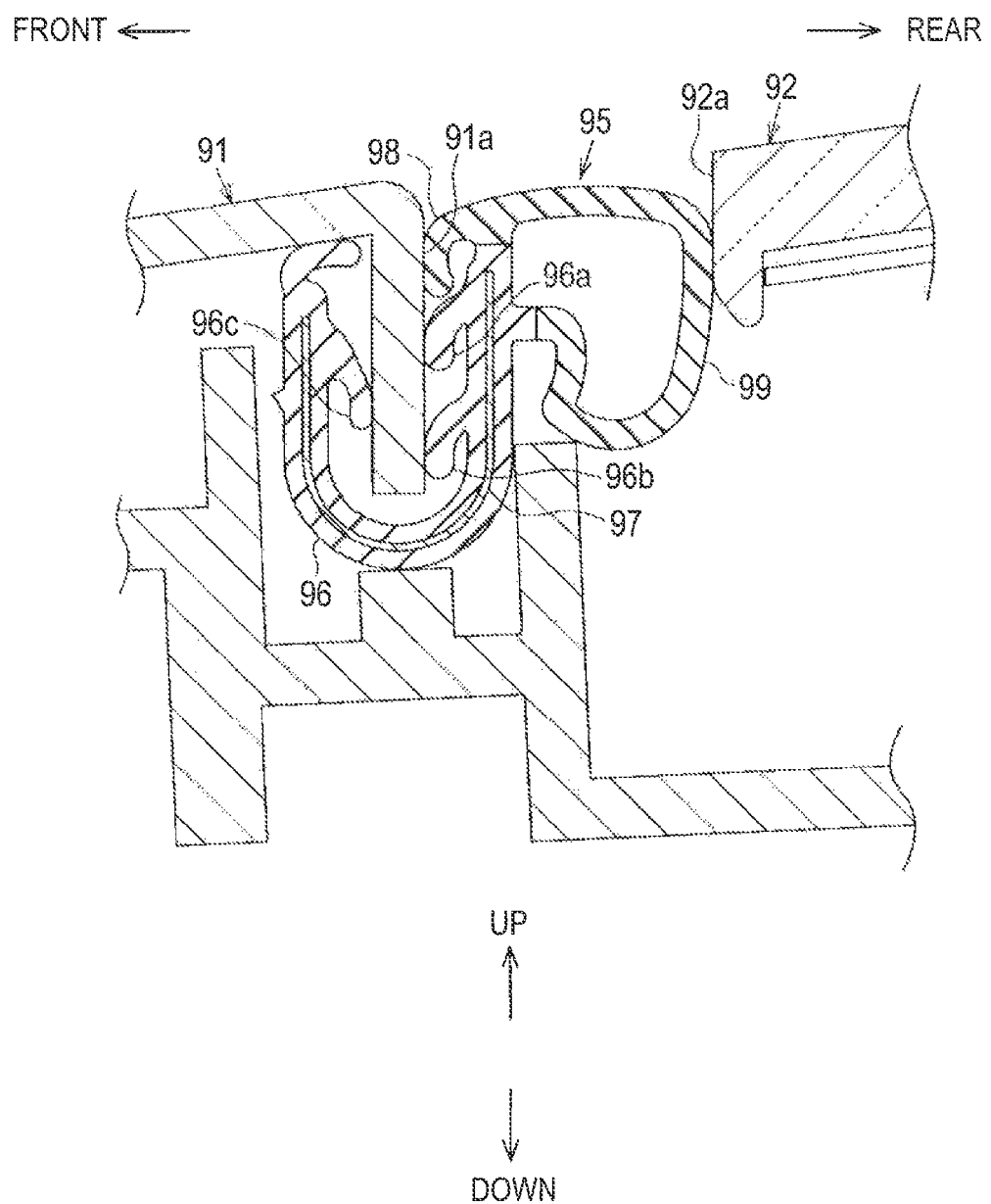
FIG. 5 is a cross-sectional view illustrating a related art.

As illustrated in FIG. 4, at a position where the mounting depressions 15a are not formed, the lip portion 36 abuts against a rear end surface of the mounting wall 15 at the distal end thereof and hence is resiliently deformed to close rearward of the vehicle about a proximal end thereof. The pinching strip 33 is provided with a receiving depression 33a configured to accommodate the lip portion 36 coming into abutment with the rear end surface of the mounting wall 15.

The first seal portion 34 and the second seal portion 35 are formed of a sponge material formed of urethane rubber, for example. The first seal portion 34 is connected at both ends thereof with an upper end of the attaching portion 31 and a lower end of the pinching strip 32, respectively, and is formed into a substantially arc shape in cross section protruding toward the body-side flange portion 10b forward of the vehicle. The first seal portion 34 is formed to have a hollow cross section having a substantially D shape in cooperation with the attaching portion 31, and resiliently deforms and partly overlaps with the body-side flange portion 10b of the roof 10 in the vehicle height direction and comes into liquid-tight contact therewith. In contrast, the second seal portion 35 is connected at both end thereof to the upper end of the attaching portion 31 and a lower end of the pinching strip 33, respectively, and is formed into a substantially arc shape in cross section protruding toward the panel-side flange portion 12a rearward of the vehicle. The second seal portion 35 is also formed to have a D-shaped hollow cross section in cooperation with the attaching portion 31, and resiliently deforms and partly overlaps with the panel-side flange portion 12a of the movable panel 12 in the fully closed state in the vehicle height direction and comes into liquid-tight contact therewith.

Subsequently, an operation of the embodiment will be described.

The front side portion of the weather strip 30 is fixed to the front housing 14 by the mounting wall 15 pinched by the attaching portion 31, and the lip portion 36 in engagement with the mounting depressions 15a. In this case, the attaching portion 31 basically has a structure in which the mounting wall 15 is pinched by the pair of the pinching strips 32 and 33, so that dimensions of the attaching portion 31 occupying a space between the body-side flange portion 10b and the panel-side flange portion 12a are reduced.

As described in detail thus far, according to the embodiment, the following advantages are achieved.

(1) In the embodiment disclosed here, the dimensions of the attaching portion 31 occupying the space between the body-side flange portion 10b and the panel-side flange portion 12a may be reduced. A distance between the body-side flange portion 10b and the panel-side flange portion 12a may be reduced by an extent corresponding to the reduction of the dimensions of the attaching portion 31 occupying the space between the body-side flange portion 10b and the panel-side flange portion 12a, whereby a good appearance is achieved. A space on a cabin side may also be enlarged.

(2) In the embodiment disclosed here, three positions including one position where the lip portion 36 abuts against the mounting depressions 15a and two positions where the both abutting portions 32b and 32c at the upper portion and the lower portion of the one position abut the mounting wall 15 are dominant as the positions of abutment between the attaching portion 31 and the mounting wall 15, so that the posture of the weather strip 30 is further stabilized.

(3) In the embodiment disclosed here, the lip portion 36 which abuts against the mounting wall 15 at the position where the mounting depressions 15a are not formed is accommodated in the receiving depression 33a, whereby the weather strip 30 is resiliently deformed by a reaction force of the lip portion 36, for example, so that a probability that a sealing property is impaired may be reduced.

(4) In the embodiment disclosed here, the thickness of the lip portion 36 is set to be thinner than those of the respective pinching strips 32 and 33, opening of the both pinching strips 32 and 33 by the reaction force of the lip portion 36, or affecting on the hollow cross section by the second seal portion 35 may be restrained.

The embodiment described above may be modified as follows.

In the embodiment disclosed here, the first seal portion 34 coming into contact with the body-side flange portion 10b may be supported by the upper end of the attaching portion 31 in a cantilevered manner. If an operation of the movable panel 12 is not affected, the second seal portion 35 coming into contact with the panel-side flange portion 12a in the fully closed state may be supported by the upper end of the attaching portion 31 in a cantilevered manner.

In the embodiment disclosed here, the receiving depression 33a of the pinching strip 33 may be omitted.

In the embodiment disclosed here, one mounting depression extending over a substantially entire length of the mounting wall 15 in the longitudinal direction may be employed instead of the plurality of mounting depressions 15a. In this case, the lip portion 36 is capable of being engageably inserted into the mounting depression over the substantially entire length thereof, and hence the receiving depression 33a of the pinching strip 33 may be omitted.

In the embodiment disclosed here, the pinching strip 32 may abut against the mounting wall 15 only at the abutting portion 32c.

In the embodiment disclosed here, the pinching strip 32 may abut against the mounting wall 15 over the substantially entire range in the vehicle height direction.

In the embodiment disclosed here, the positional relationship of the both pinching strips 32 and 33 in the fore-and-aft direction may be verse versa. In other words, the both pinching strips 32 and 33 may be arranged at the rear and the front by the intermediary of the mounting wall 15 therebetween. In this case, the front end surface of the mounting wall 15 may be provided with the mounting depressions 15a.

In the embodiment disclosed here, a fixing structure between the guide rails 13 and the side portion of the weather strip 30, or a fixing structure between the rear housing 16 and the rear side portion of the weather strip 30 may be provided instead of, or in addition to, the fixing structure of the front side portions of the front housing 14 (the mounting wall 15) and the weather strip 30. In the respective cases, the guide rails 13 and the rear housing 16 as mounting member may be formed of a resin.

The opening and closing operation of the opening 10a by the movable panel 12 may be a sliding operation in a pop-up state in which the front side portion and the rear side portion both move upward.

The opening and closing of the entire opening 10a may be shared by a plurality of movable panels arranged in parallel in the fore-and-aft direction.

An aspect of this disclosure is directed to a roof apparatus including: a movable panel configured to open and close an opening formed in a roof of a vehicle; a mounting member including a mounting wall extending upright in one direction along an edge portion of the opening; and a weather strip having an attaching portion including a pair of pinching strips configured to pinch the mounting wall therebetween, a first seal portion connected to the attaching portion and coming into liquid-tight contact with an opening end edge extending along the mounting wall of the opening, and a second seal portion connected to the attaching portion and coming into liquid-tight contact with a peripheral edge along the mounting wall of the movable panel in a fully closed state, wherein a mounting depression depressed in the inner and outer direction of the vehicle is formed on the mounting wall, and the attaching portion includes a lip portion connected to one of the pair of pinching strips which faces the mounting depression, and engageably inserted into the mounting depression.

According to the configuration described above, the weather strip is fixed to the mounting member by pinching the mounting wall with the attaching portion and fitting the lip portion into mounting depressions. In this case, the attaching portion basically has a structure in which the mounting wall is pinched by the pair of pinching strips, whereby the dimensions of the attaching portion occupying the space between the opening end edge and the peripheral edge may further be reduced.

In the roof apparatus described above, it is preferable that one of the pair of the pinching strips which does not face the mounting depressions has a pair of abutting portions which abut against the mounting wall at an upper portion and a lower portion with respect to a position where the lip portion abuts against the mounting depressions in a vehicle height direction.

In this configuration, three positions including one position where the lip portion abuts against the mounting depressions and two positions where the both abutting portions abut against the mounting wall at the upper portion and the lower portion of the one position are dominant as the positions of abutment between the attaching portion and the mounting wall, so that the posture of the weather strip is further stabilized.

In the roof apparatus described above, it is preferable that a plurality of the mounting depressions are formed in line in a direction of extension of the mounting wall, and one of the pair of the pinching strips which faces the mounting depressions is provided with a receiving depression configured to accommodate the lip portion which abuts against the mounting wall at a position where the mounting depressions are not formed.

In this configuration, the lip portion which abuts against the mounting wall at the position where the mounting depressions are not formed is accommodated in the receiving depression, whereby the weather strip is resiliently deformed by a reaction force of the lip portion, for example, so that a probability that a sealing property is impaired may be reduced.

In the roof apparatus described above, it is preferable that a thickness of the lip portion is thinner than one of the pinching strips which faces the mounting depressions.

In this configuration, the both pinching strips may be prevented from opening by the reaction force of the lip portion or from affecting on a second seal portion.

In the roof apparatus described above, it is preferable that the mounting depressions are depressed from inside to outside of the vehicle.

In the roof apparatus described above, it is preferable that the mounting wall is provided alone on the mounting member.

In the roof apparatus described above, it is preferable that the roof apparatus further includes: a pair of guide rails provided on both side end portions of the opening in a vehicle width direction; and a housing configured to couple the pair of guide rails, wherein the mounting member is the housing.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A roof apparatus comprising:
    a movable panel configured to open and close an opening formed in a roof of a vehicle;
    a mounting member including a mounting wall extending upright n one direction along an edge portion of the opening; and
    a weather strip having an attaching portion including a pair of pinching strips configured to pinch the mounting wall therebetween, a first seal portion connected to the attaching portion and coming into liquid-tight contact with an opening end edge extending along the mounting wall of the opening, and a second seal portion connected to the attaching portion and coming into liquid-tight contact with a peripheral edge along the mounting wall of the movable panel in a fully closed state,
    wherein a mounting depression is formed on the mounting wall, and
    the attaching portion includes a lip portion connected to one of the pair of pinching strips which faces the mounting depression, and engageably inserted into the mounting depression.

2. The roof apparatus according to claim 1, wherein one of the pair of the pinching strips which does not face the mounting depression has a pair of abutting portions which abut against the mounting wall at an upper portion and a lower portion with respect to a position where the Hp portion abuts against the mounting depression in a height direction of the vehicle.

3. The roof apparatus according to claim 1, wherein a plurality of the mounting depressions are formed in line in a direction of extension of the mounting wall, and
    one of the pair of the pinching strips which faces the mounting depressions is provided with a receiving depression configured to accommodate the Hp portion which abuts against the mounting wall at a position where the mounting depressions are not formed.

4. The roof apparatus according to claim 1, wherein a thickness of the Hp portion is thinner than that of the one of the pinching strips which faces the mounting depression.

5. The roof apparatus according to claim 1, wherein the mounting depression is depressed from inside to and an outside of the vehicle.

6. The roof apparatus according to claim 1, wherein the mounting member extends in a vehicle width direction along a front edge portion of the opening.

7. The roof apparatus according to claim 1, further comprising:
    a pair of guide rails provided on both side end portions of the opening in a vehicle width direction; and
    a housing configured to couple the pair of guide rails, wherein
    the mounting member is the housing.

* * * * *